US010589880B2

(12) United States Patent
Parissenti et al.

(10) Patent No.: US 10,589,880 B2
(45) Date of Patent: Mar. 17, 2020

(54) PASSIVE DEVICE DESIGNED TO FACILITATE DEMISE OF A SPACE SYSTEM DURING RE-ENTRY INTO THE EARTH'S ATMOSPHERE

(71) Applicant: Thales Alenia Space Italia S.p.A. Con Unico Socio, Rome (IT)

(72) Inventors: Guido Parissenti, Turin (IT); Primo Attina', Turin (IT); Roberto Destefanis, Turin (IT); Corrado Gennaro, Turin (IT); Lilith Grassi, Turin (IT); Marco Nebiolo, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 356 days.

(21) Appl. No.: 15/532,346

(22) PCT Filed: Dec. 1, 2015

(86) PCT No.: PCT/IB2015/059257
§ 371 (c)(1),
(2) Date: Jun. 1, 2017

(87) PCT Pub. No.: WO2016/088044
PCT Pub. Date: Jun. 9, 2016

(65) Prior Publication Data
US 2017/0327251 A1   Nov. 16, 2017

(30) Foreign Application Priority Data

Dec. 1, 2014 (IT) .............................. TO2014A0998

(51) Int. Cl.
*B64G 1/62* (2006.01)
*B64G 1/10* (2006.01)
(Continued)

(52) U.S. Cl.
CPC ................. *B64G 1/62* (2013.01); *B64G 1/10* (2013.01); *B64G 1/1021* (2013.01); *B64G 1/64* (2013.01);
(Continued)

(58) Field of Classification Search
CPC .......... B64G 1/64; B64G 1/641; B64G 1/645; B64G 1/62; F16B 31/007; F16B 31/021; F16B 5/02; F16B 5/0088; F16B 9/02
See application file for complete search history.

(56) References Cited

U.S. PATENT DOCUMENTS

| 5,119,555 A * | 6/1992 | Johnson | B23P 11/025 29/254 |
|---|---|---|---|
| 2003/0128491 A1* | 7/2003 | Bueno Ruiz | B64G 1/222 361/115 |
| 2007/0069081 A1* | 3/2007 | Roder | B64G 1/283 244/165 |

FOREIGN PATENT DOCUMENTS

| JP | 2010247719 | 11/2010 |
|---|---|---|
| WO | WO 2011135230 | 11/2011 |

(Continued)

OTHER PUBLICATIONS

Russell P. Patera et al., The Realities of Reentry Disposal, Proceedings of the AAS/AIAA Space Flight Mechanics Meeting, Jan. 1, 1998: Http://www.globalsecurity.org/space/libraruy/report/enviro/reentrypaper.pdf.
(Continued)

*Primary Examiner* — Philip J Bonzell
*Assistant Examiner* — Tye William Abell
(74) *Attorney, Agent, or Firm* — McCarter & English, LLP

(57) ABSTRACT

Space system comprising a structure formed by structure components, an on-board equipment carried by the structure, and a passive device designed to facilitate demise of the
(Continued)

space system during re-entry into the Earth's atmosphere. The passive device comprises connecting members designed to stably connect the structure components. The connecting members comprise at least a portion made of a primer material with characteristics such as to decay at re-entry altitudes higher than those at which the current connecting members melt so as to make unstable the connection created by the connecting members to such an extent as to early triggering demise of the structure of the space system during re-entry into the Earth's atmosphere.

13 Claims, 11 Drawing Sheets

(51) Int. Cl.
*B64G 1/64* (2006.01)
*F16B 31/00* (2006.01)

(52) U.S. Cl.
CPC ...... *B64G 1/641* (2013.01); *B64G 2001/1092* (2013.01); *F16B 31/007* (2013.01)

(56) References Cited

FOREIGN PATENT DOCUMENTS

WO    WO 2014045078      3/2014
WO    WO-2014045078 A1 *   3/2014

OTHER PUBLICATIONS

PCT International Search Report and Written Opinion for PCT/IB2015/059257 dated Feb. 19, 2016.

* cited by examiner

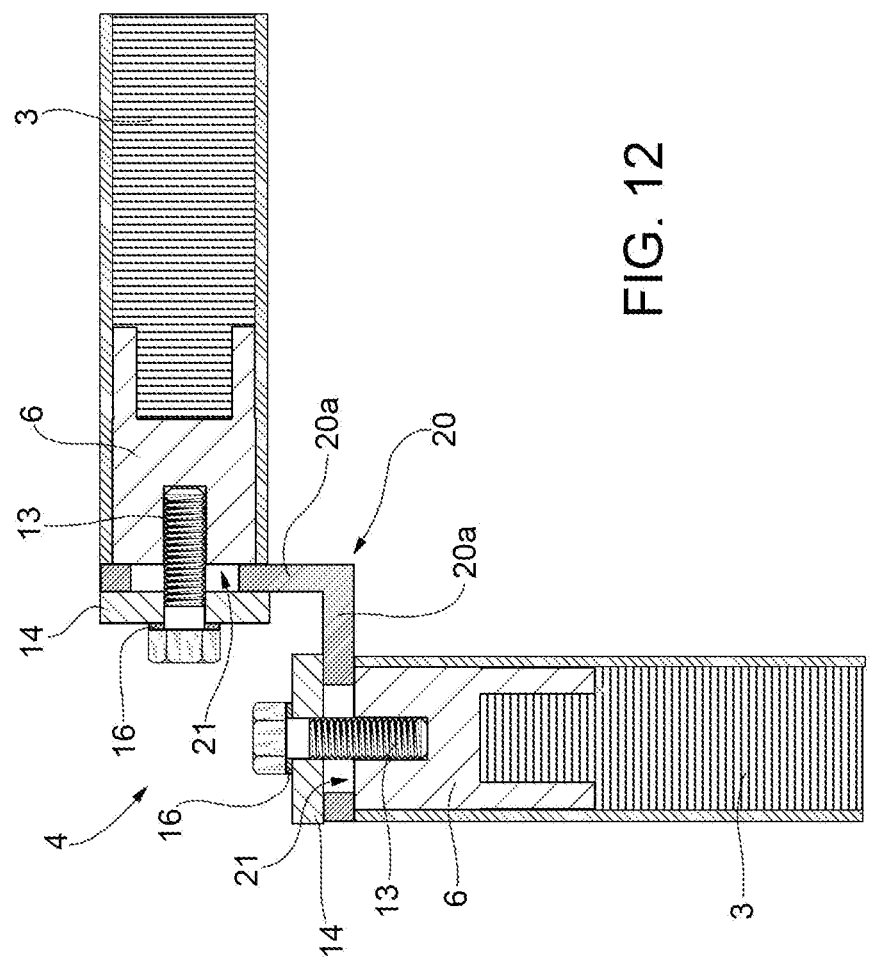

PASSIVE DEVICE DESIGNED TO FACILITATE DEMISE OF A SPACE SYSTEM DURING RE-ENTRY INTO THE EARTH'S ATMOSPHERE

CROSS-REFERENCE TO RELATED APPLICATIONS

This application is a 35 U.S.C. § 371 National Stage filing of International Application No. PCT/IB2015/059257 filed on Dec. 1, 2015, which claims priority to Italian Patent Application TO2014A000998 filed on Dec. 1, 2014.

TECHNICAL FIELD OF THE INVENTION

The present invention relates in general to space systems, and more particularly to passive devices designed to facilitate demise of space systems during re-entry into the Earth's atmosphere.

In particular, the present invention finds advantageous, but not exclusive, application to satellites, especially Low Earth Orbit (LEO) satellites, to which the following description will explicit refer without thereby losing generality.

STATE OF THE ART

The impact of space activities on the space environment and on the Earth are the focus of current research. In particular, the mitigation of the impacts on the population caused by re-entry into the Earth's atmosphere of space systems poses a number of challenges, and requires indications on how this problem can be handled.

In fact, Earth orbit satellites, and LEO satellites, due to equipment failure, unexpected effects or natural orbital decay, fall on the Earth at very high speeds, thus undergoing a fragmentation caused by high temperatures generated by the friction with the Earth's atmosphere combined with high aerodynamic forces.

The main part of the fragments dissolve in the Earth's atmosphere due to the high friction temperatures. However, those parts made with more heat-resistant materials are the fragments with the highest probability of reaching the Earth's surface.

To mitigate the risk for the population on the ground to be hit by satellite fragments, the space agencies are imposing the implementation of a specific design parameter, called re-entry casualty risk, to less than $10^{-4}$.

Taking into account the risk for the population on the ground, the spacecraft must be designed so that those parts of the satellite which survive the re-entry into the atmosphere at the end of the mission can generate a casualty risk lower than $10^{-4}$. This can be achieved through the careful selection of the materials and of the architecture of the spacecraft. However, these solutions must not jeopardize the spacecraft ability to survive in space for a certain number of years, during which it is subject to degradation and to the risks arising from the orbital environment and from possible impacts with space debris.

The design solutions presently adopted to meet (at least partially) these conditions can be grouped into two categories.

The category normally referred to as "controlled re-entry" requires larger propellant tanks and more robust control systems of the spacecraft holding, so as to guide the re-entering spacecraft towards an area with low population density, for example oceans. This category, however, may be impractical in the event of an unrecoverable failure of the control system or of the communication system of the space system.

A category with a reduced casualty risk alternative to the controlled re-entry involves replacement of the components that can reach the Earth's surface, such as propellant tanks, with others dissolving during the atmospheric re-entry. This category, however, requires the use of components which are not available on the market yet.

All the aforesaid solutions, however, involve additional costs for the design development of the space vehicles and for the use of special components. This additional cost is not related to the spacecraft mission, but only to its re-entry.

WO 2014/045078 A1 describes a space system provided with a re-entry signalling apparatus adapted to transmit, during re-entry of the space system into the Earth's atmosphere, an alert signal containing information of the location, on the ground or in space, where the debris of the space system may fall. The apparatus comprises an aerodynamic casing provided with a thermal shield containing a geo-location receiver, a transmitter and a processor, and connected to the space system via a connector comprising bolts which melt or become brittle at a given temperature during re-entry into the Earth's atmosphere, so as to break during the re-entry of the space system into the Earth's atmosphere and cause the casing to be released.

OBJECT AND SUMMARY OF THE INVENTION

The object of the present invention is therefore providing a simple and economical solution for the design of satellites which is able to satisfy at the same time the requirements relating to their survival in orbit and those relating to their demise during re-entry into the Earth's atmosphere at the end of their mission.

According to the present invention, a space system is provided, as claimed in the appended claims.

BRIEF DESCRIPTION OF THE DRAWINGS

FIGS. 12 to 14 show a connecting member intended to connect two satellite panels according to a yet further different embodiment of the invention.

DETAILED DESCRIPTION OF PREFERRED EMBODIMENTS OF THE INVENTION

The present invention will now be described in detail with reference to the accompanying drawings to enable a skilled person to implement and use it. Various modifications to the embodiments described will be immediately appreciable to the skilled person and the generic principles described may be applied to other embodiments and applications without thereby departing from the scope of the present invention, as defined by the appended claims. Therefore, the present invention should not be considered as limited to the described and shown embodiments, but it is to be accorded the widest scope complying with the principles and features described and claimed.

The present invention stems from the appreciation that satellite on-board equipment (e.g. electronics boxes, fluidic components, tanks, etc.) is mounted to a lesser extent outside the satellite structure, for example the antennas and the solar panels, and to a greater extent inside the satellite structure.

During re-entry into the Earth's atmosphere, aero-thermodynamic forces start to fragment the exterior equipment. The interior equipment, on the other hand, begins to fragment only after the erosion of the protective elements of the satellite structure. A retarding effect of the fragmentation is therefore induced by the satellite structure.

The Applicant has now conceived that, by anticipating the fragmentation of the satellite structure, also the fragmentation of the satellite is advanced, thus increasing the exposure of the satellite fragments to high temperatures, with benefit to the casualty risk.

In broad terms, therefore, the present invention provides for including in the mechanical design of the satellite a passive device designed to facilitate the demise of the space system during re-entry into the Earth's atmosphere, and in particular formed by specific elements capable of "triggering" in advance the demise of the satellite structure during re-entry into the atmosphere.

The "primer" is realized by using materials able to "decay" at temperatures lower than those of the materials normally used in the satellite structures (AL alloys, Titanium, CRFP), but at the same time sufficiently "resistant" to high temperatures and to the operating conditions of the satellite during launch and orbit operation.

The primer elements are inserted in the mechanical mounting of the panels to which the satellite equipment is mounted, and in particular in the connecting members that connect the panels of the satellite structure one to the other.

Figure 1:
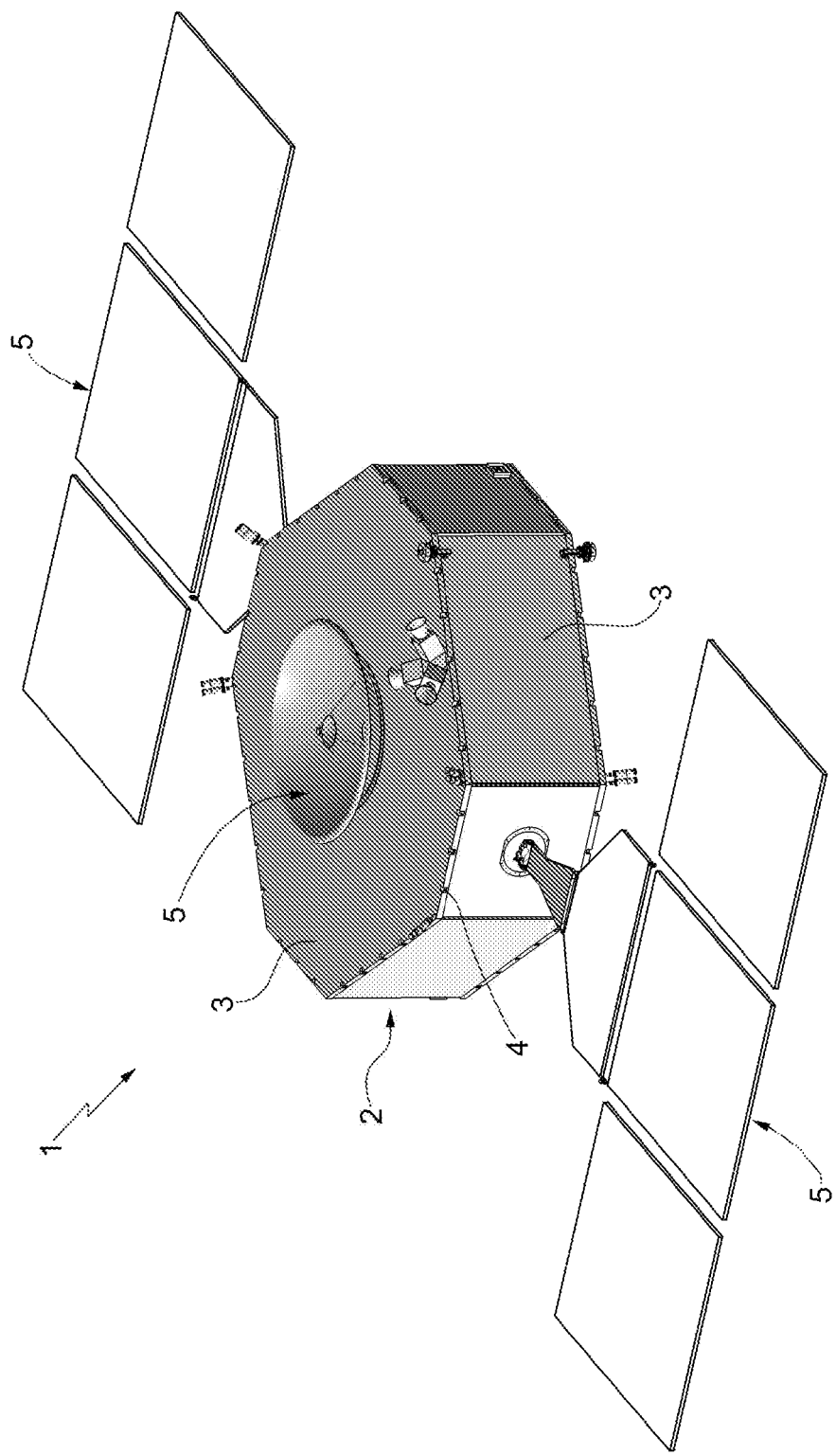
FIGS. 1 to 3 show a satellite in a fully assembled configuration and in different configurations with disassembled or removed parts to allow the vision of its interior.
Figure 2:
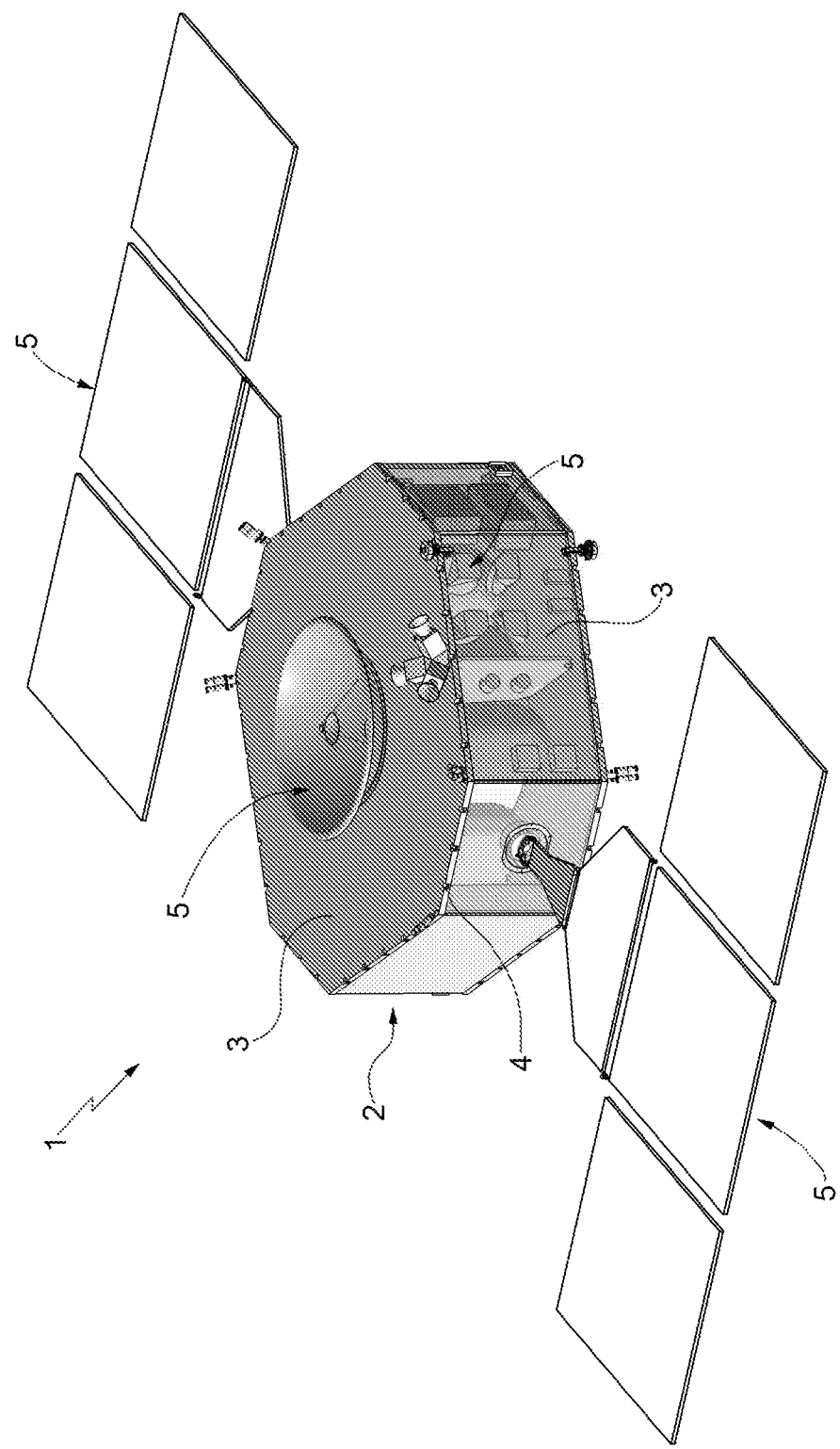
Figure 3:
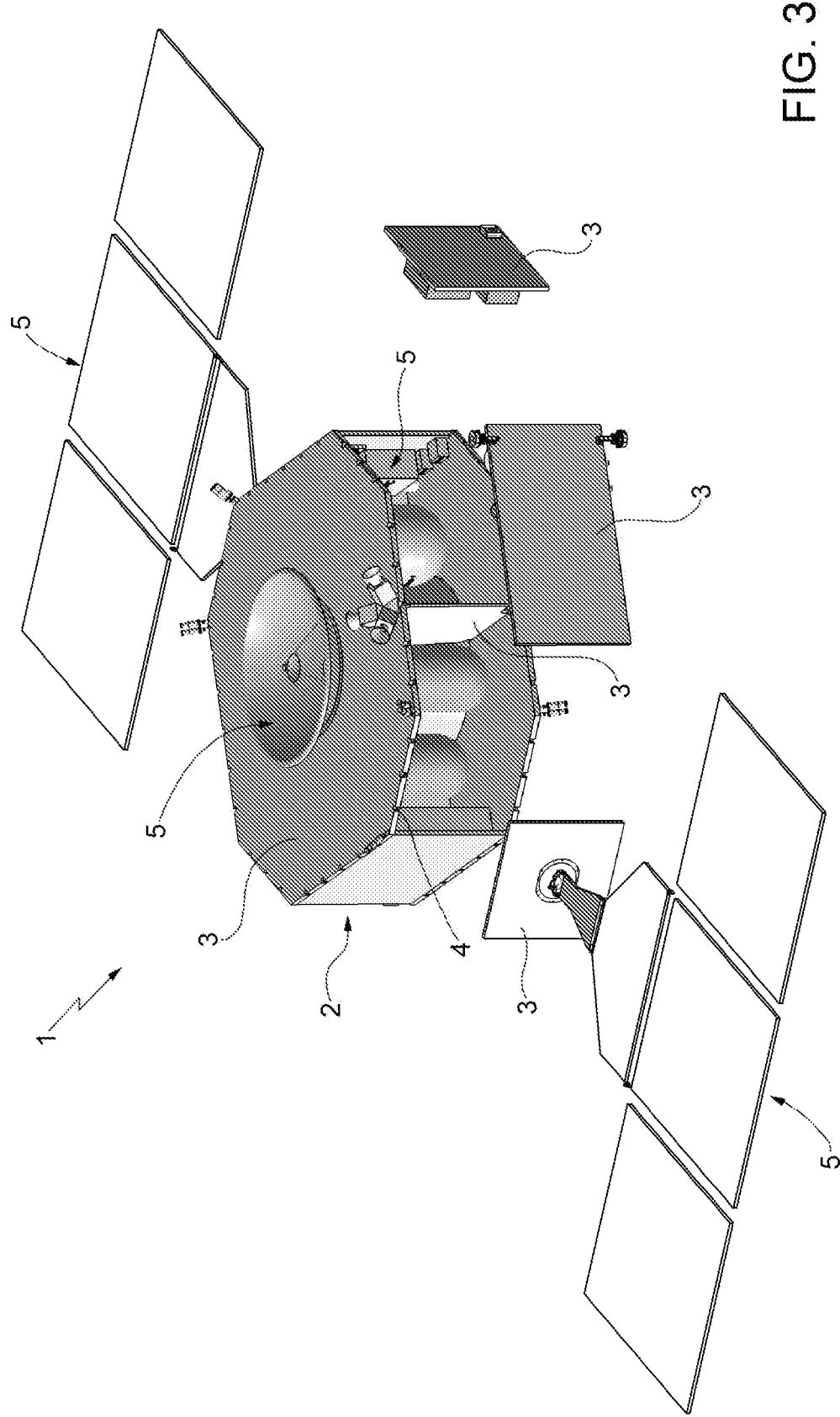

FIGS. 1 to 3 show, and indicated by 1 as a whole, a satellite designed according to the present invention, which should demise during re-entry into the Earth's atmosphere at the end of its mission.

The satellite 1 essentially comprises a structure 2 formed by outer and inner panels 3 adapted to perform a structural function of support and protection, which typically have a honeycomb structure of aluminium alloy coated with layers of carbon fibres and are connected by means of connecting members 4; and an on-board equipment 5 carried by the structure 2 of the satellite 1 and comprising an exterior equipment, such as an antenna and solar panels, carried by the outer panels, and an interior equipment of various kinds carried by the inner panels.

According to the present invention, the satellite 1 further comprises a passive device designed to facilitate the demise of the satellite during re-entry into the Earth's atmosphere.

The passive device is formed by the connecting members 4, which are specially designed to stably connect the panels 3 of the structure 2 of the satellite 1 during launch and orbit operation of the satellite 1, and to trigger in advance the fragmentation of the structure 2 of the satellite 1 during re-entry into the Earth's atmosphere.

To this aim, the connecting members 4 comprise at least a portion made of a material, hereinafter referred to as "primer material", whose characteristics decay at re-entry altitudes of the satellite 1 higher than those at which the current connecting members decay, for example between 120 and 70 km, so as to make unstable the connection of the panels 3 of the structure 2 of the satellite 1 created by the connecting members 4 to such an extent as to trigger the demise of the structure 2 of the satellite 1 during re-entry into the Earth's atmosphere in advance with respect to what is currently occurring.

By way of non-limiting example, the primer material may conveniently comprise a metal alloy with a low melting point comprised between 90 and 120° C., and conveniently comprises an eutectic metallic.

According to a first embodiment of the invention, each connecting member 4 is mounted to exert between a pair of panels 3 a stable connection force in a given connection direction during launch and orbit operation of the satellite 1, and to enable the two panels 3 to disengage from each other by sliding in a direction transverse to the coupling direction during the satellite re-entry into the Earth's atmosphere.

Figure 4:
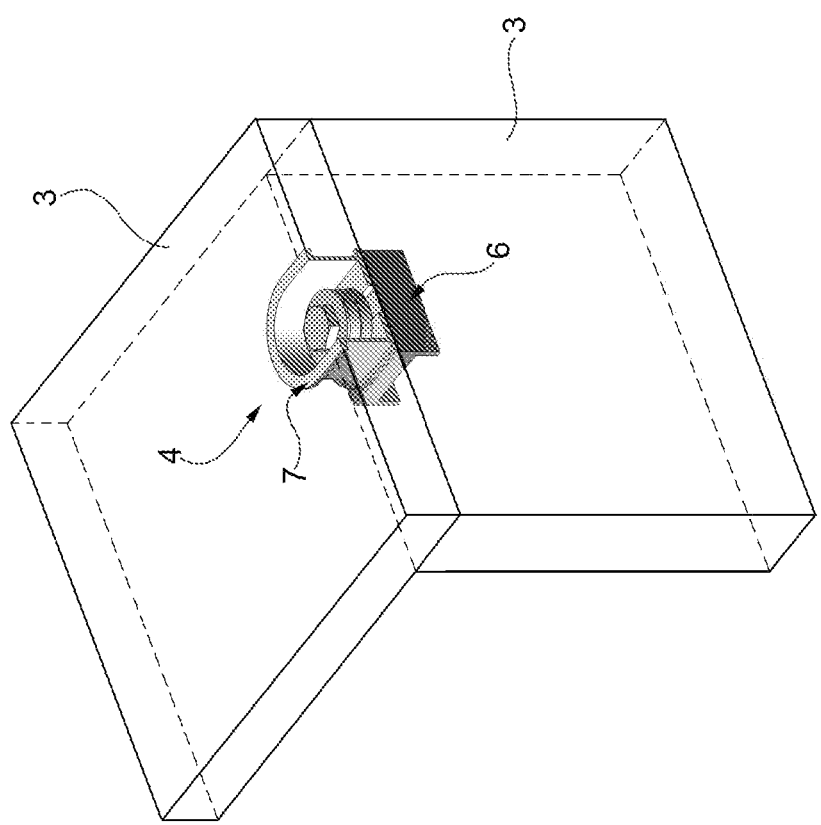
FIGS. 4 to 6 show a connecting member intended to connect two satellite panels according to an embodiment of the invention.
Figure 5:
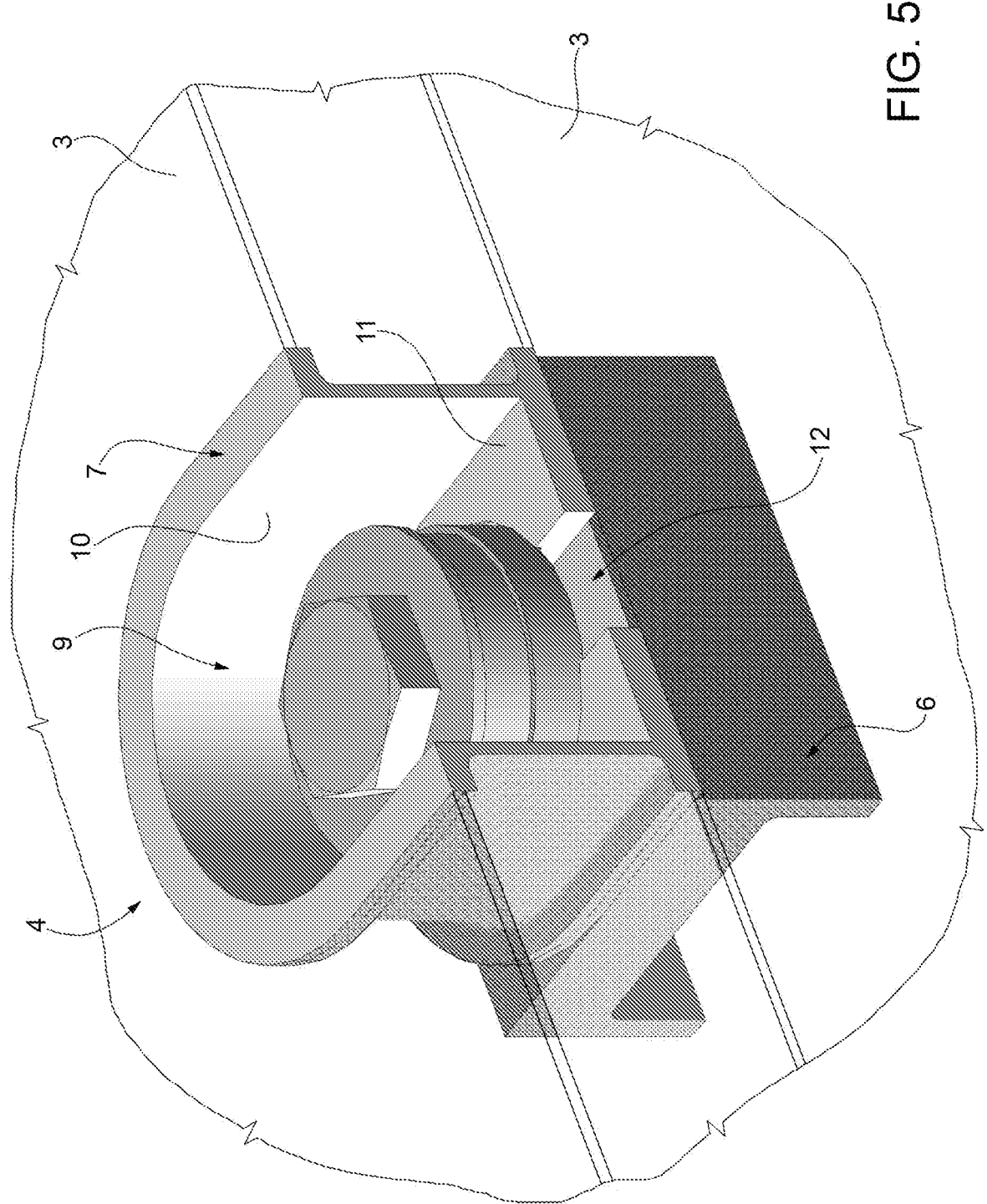
Figure 6:
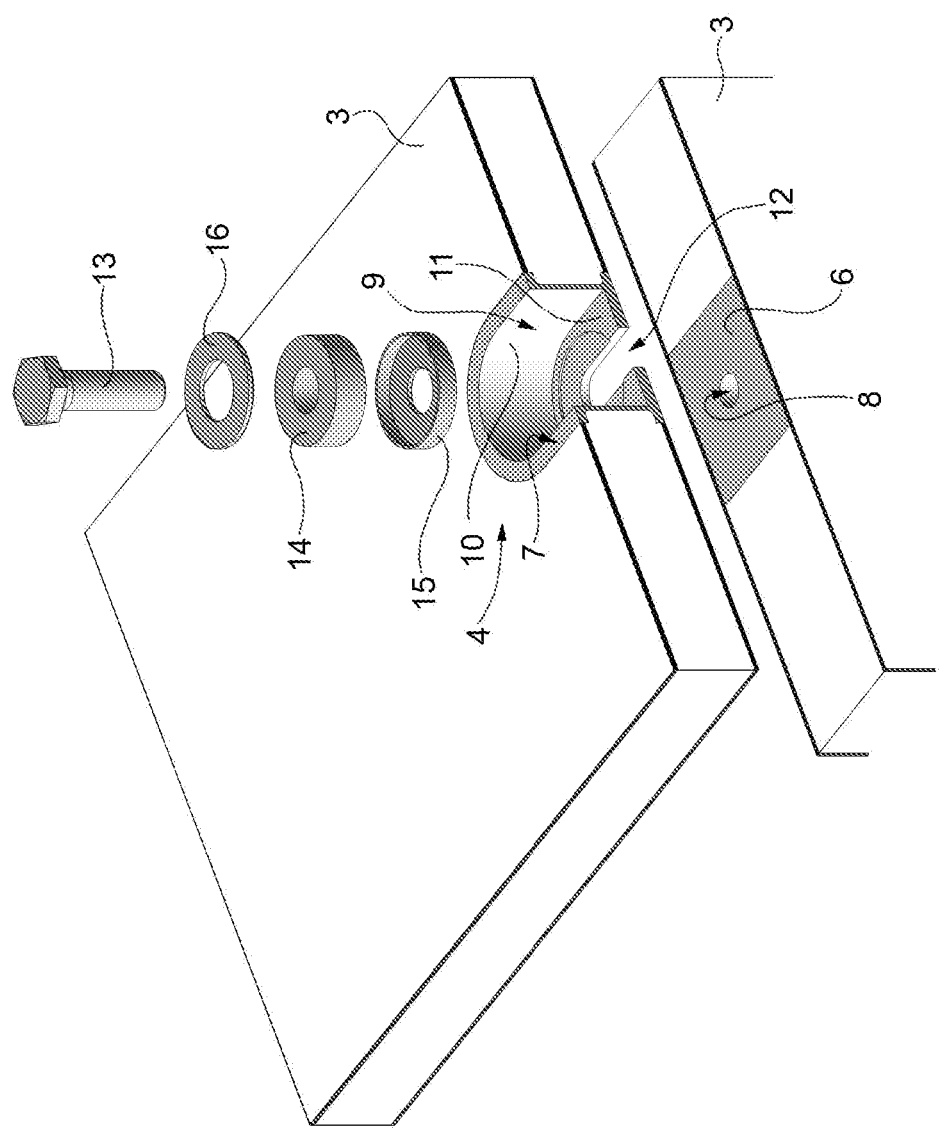

A possible implementation of this first embodiment is shown in FIGS. 4 to 6, wherein each connecting member 4 comprises two structural elements 6, 7 made of metal, hereinafter referred to as inserts, which are stably coupled to, in particular inserted in, the panels 3, in the example shown along respective edges, in a substantially intermediate position. A first insert, in the example shown the one designated by 6, is provided with a threaded hole 8 formed on a flat face of the insert 6 coplanar to the side face of the respective panel 3.

The second insert, in the example shown the one designated by 7, is hollow and defines a cavity 9 bounded by a side wall 10 and a bottom 11, which is adapted to be arranged, when the two panels 3 are connected, in contact with the face of the first insert 6 on which the threaded hole 8 is formed. The bottom 11 has a slot 12 with an open side on the edge of the respective panel 3 which, when the two panels 3 are connected, is in a position facing the threaded hole 8 of the first insert 6.

Each connecting member 4 further comprises a screw 13, which extends through the slot 12 of the second insert 7 and engages the threaded hole 8 in the first insert 6 so as to exert between the two inserts 6, 7 an axial force to keep them permanently in contact by friction and thus to prevent the radial sliding of the screw 13 with respect to the slot 12.

Each connecting member 4 further comprises a washer 14 made of said primer material, referred to as primer washer in the following description for convenience and for distinguishing it from similar components, which is inserted on the screw 13, is arranged between the screw head and the bottom 11 and performs, among other things, the function of ensuring the friction and the axial reaction necessary for maintaining the connection of the two inserts 6, 7 until exceeding the operating temperatures beyond which it liquefies, thus loosing the connection.

Conveniently, each connecting member 4 further comprises a holed cup-shaped body 15, hereinafter referred to as holed cupel, which is inserted on the screw 13, is arranged between the primer washer 14 and the bottom 11, and has a raised peripheral edge defining a seat in which the primer washer 14 is partially housed so as to protrude axially from the peripheral edge of the holed cupel 15. Conveniently, the raised peripheral edge of the holed cupel 15 is so sized as to limit or prevent the radial "bulging" of the primer washer 14 under the load exerted by the head of the screw 13, especially during the launch of the satellite 1, which bulging would otherwise diminish the axial reaction of the washer, and then the action exerted by the connecting member 4 on the two panels 3.

Conveniently, each connecting member 4 further comprises a further washer 16, which is also inserted on the screw 13 and is arranged between the head of the screw 13 and the primer washer 14 to evenly distribute the load exerted by the head of the screw 13 on the entire surface of the primer washer 14.

Figure 7:
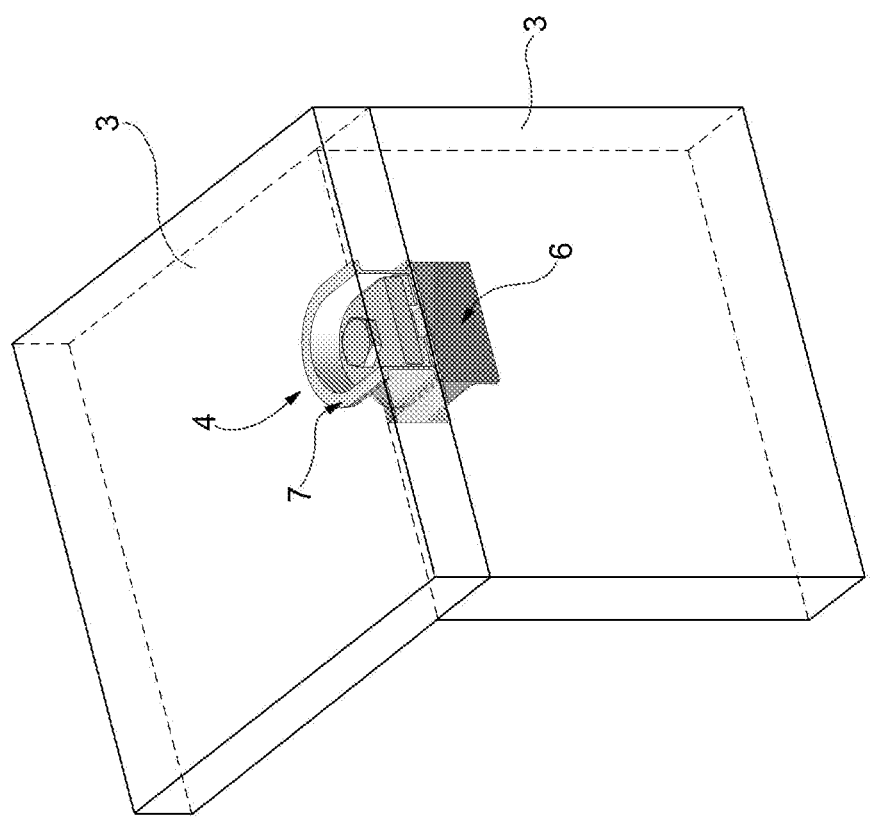
FIGS. 7 to 9 show a connecting member intended to connect two satellite panels according to a different embodiment of the invention.
Figure 8:
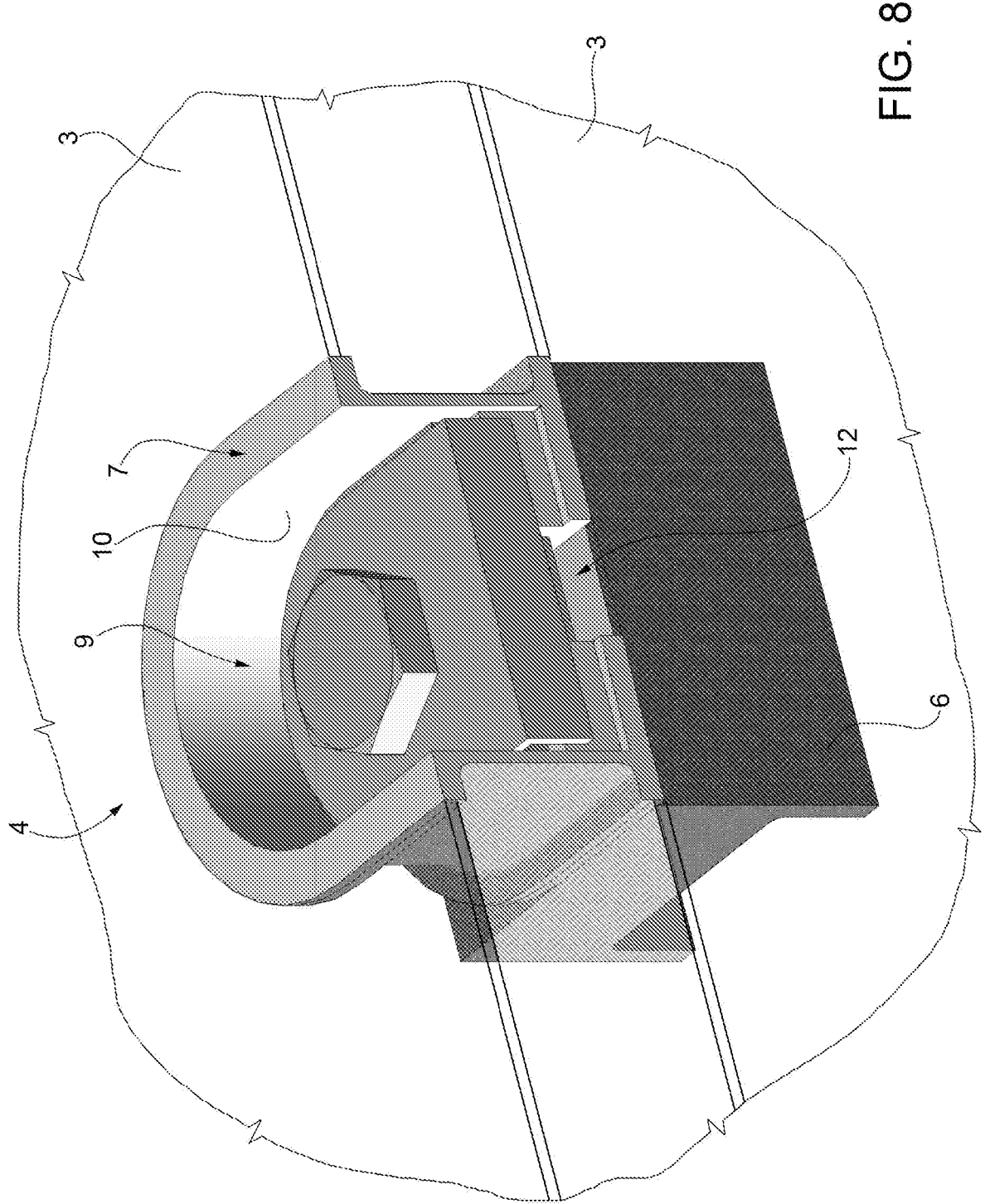
Figure 9:
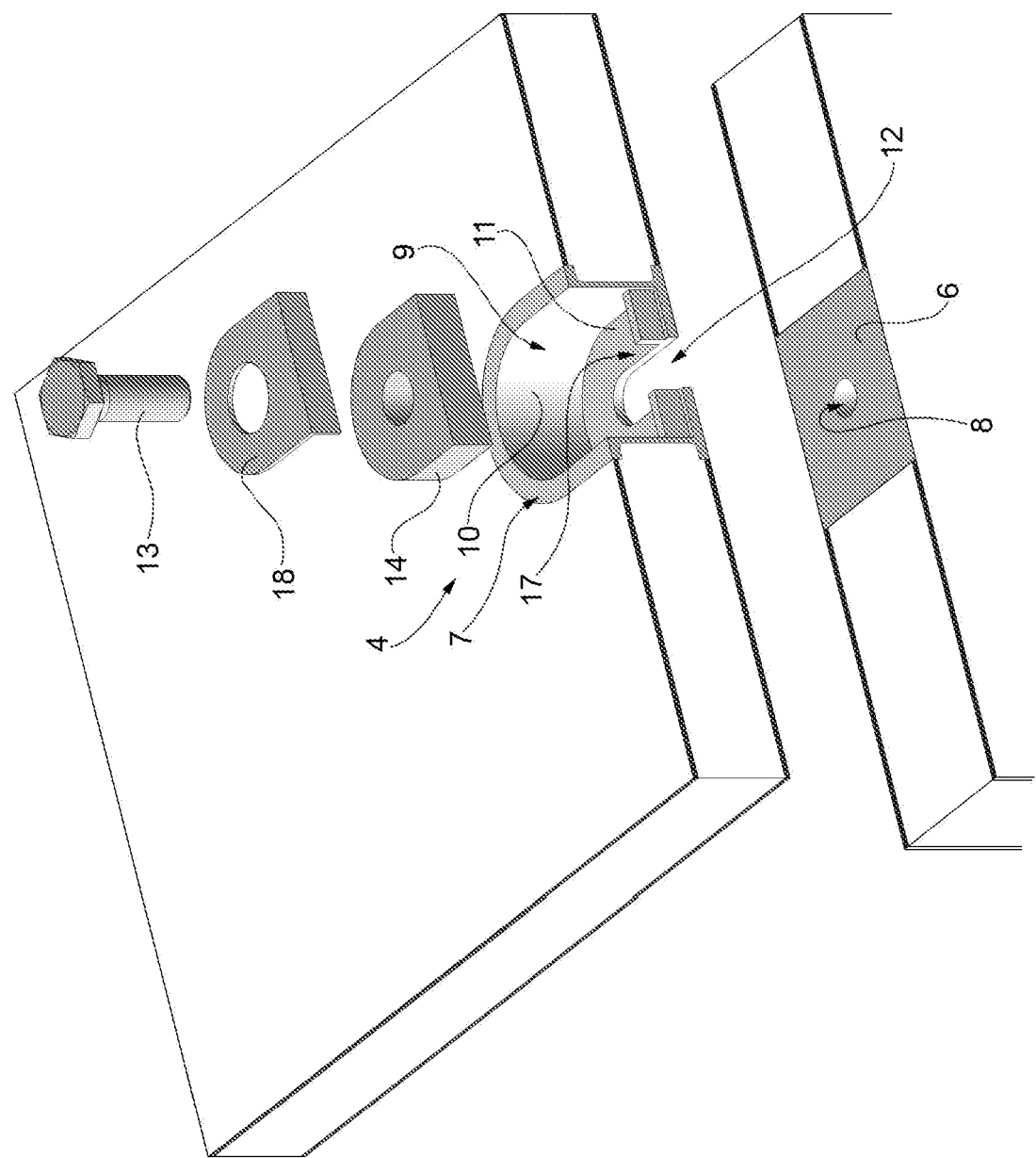

A different implementation of the first embodiment of the invention is shown in FIGS. 7 to 9, which will be described only with regard to the differences from the implementation shown in FIGS. 4 to 6, therefore using the same reference numbers to indicate the same components.

In particular, the implementation shown in FIGS. 7 to 9 differs from the one shown in FIGS. 4 to 6 in that the primer washer 14 and the holed cupel 15 are integrated in the second insert 7. To this aim, the bottom 11 of the second insert 7 is provided, on its side arranged on the edge of the respective panel 3, with an edge folded towards the inside of the cavity 9 to define, together with the bottom 11 and the side wall 10 defining the cavity 9, a seat 17 wherein the primer washer 14 is partially housed so as to protrude axially from the folded edge.

The second insert 7 thus comprises a holed plate 18 covering the primer washer 14, said holed plate 18 having an edge folded toward the folded edge of the bottom 11 and fixed to this latter, for example by gluing, to keep the primer washer 14 in the housing 17 and prevent its radial bulging caused by the load exerted by the head of the screw 13.

In both aforesaid implementations of the first embodiment of the invention, the aero-thermal-dynamic forces acting on the satellite 1 during re-entry into the atmosphere at the end of its mission cause the alteration of the eutectic in the primer washer 14 and the consequent reduction of the coupling force exerted by the connecting members 4 between the panels 3, thus allowing the second inserts 7 to slide with respect to the corresponding first inserts 6 in directions substantially orthogonal to the axes of the screws 13, so that the screws 13 accidentally slip out from the corresponding slots 12 causing the final disruption of the panels 3.

This early fragmentation of the structure 2 of the satellite 1 between 120 and 70 km altitude also causes the early fragmentation of the equipment 5, thus increasing the exposure time of the fragments at high temperatures to the benefit of the casualty risk.

In a second, different embodiment of the invention, each connecting member 4 exerts between a pair of panels 3 a stable connection force in a given connection direction during the launch and the orbit operation of the satellite 1, thus allowing the two panels 3 to disengage from each other by sliding in the connection direction during re-entry of the satellite into the Earth's atmosphere.

Figure 10:
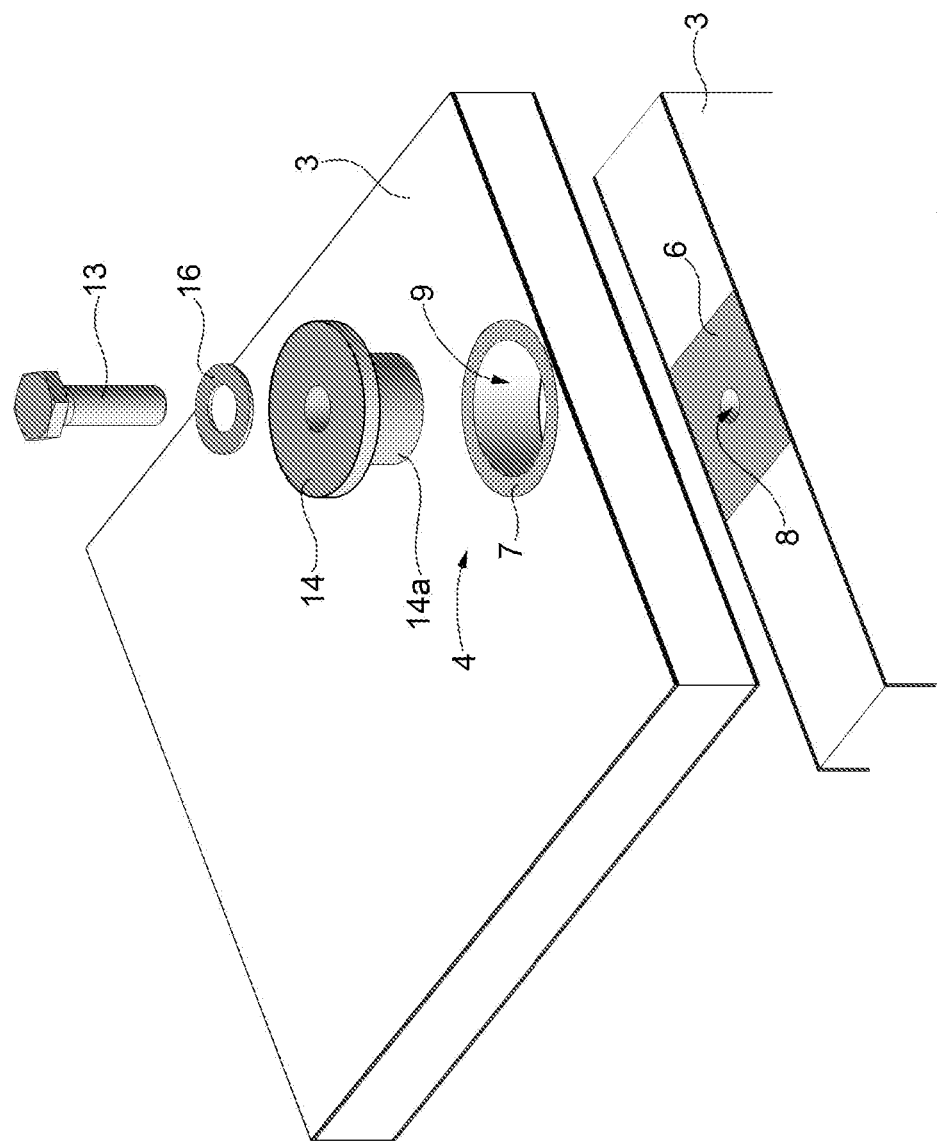
FIGS. 10 and 11 show a connecting member intended to connect two satellite panels according to a further different embodiment of the invention.
Figure 11:
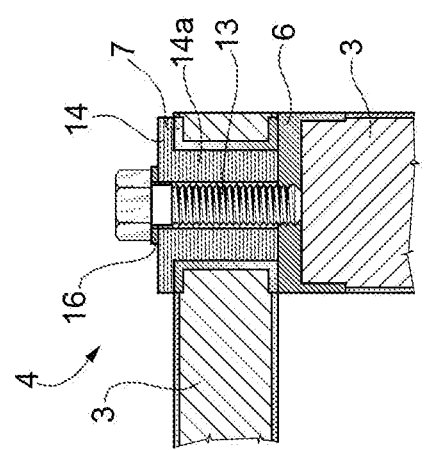

A possible implementation of this second embodiment is shown in FIGS. 10 and 11, and will be described only with regard to its differences from the first embodiment shown in FIGS. 4 to 9, thus using the same reference numbers to identify the same components.

In the implementation shown in FIGS. 10 and 11, the second insert 7 comprises a tubular member defining a through hole 9 which, when the two panels 3 are connected, is coaxial to the threaded hole 8 of the first insert 6 and has a diameter greater than the one of the head of the screw 13.

The primer washer 14 is arranged between the head of the screw 13 and the through hole 9 and has an outer diameter greater than the one of the through hole 9 so as to extend laterally and rest on the surface of the respective panel 3, outside the through hole 9.

Conveniently, the primer washer 14 is further integrally provided with a tubular appendix 14a which is made of said primer material, extends through the through hole 9 and is sized so as to completely fill the through hole 9.

In this implementation, the melting of the primer washer 14 and of its appendix 14a during re-entry of the satellite 1 into the Earth's atmosphere removes any connection between the two panels 3, allowing them to disengage from each other by sliding in the coupling direction.

A different implementation of the second embodiment of the invention is shown in FIG. 12, which will be described only with regard to the differences from the implementation shown in FIGS. 10 and 11, thus using the same reference numbers to identify the same components.

In particular, the implementation shown in FIG. 12 differs from the one shown in FIGS. 10 and 11 in that both panels are fitted with identical inserts to the first insert 6 and are connected together through an L-shaped bracket 20 whose arms 20a are respectively connected to a corresponding insert 6 by means of screws 13 which engage respective holes made in the arms 20a via the respective primer washers 14 deprived of the appendix 14a.

The holes formed in the arms 20a of the bracket 20 have a greater diameter than the one of the heads of the screws 13, while the primer washers 14 have an outer diameter greater than the one of the holes formed in the arms 20a of the bracket 20.

As shown in FIGS. 13 and 14, the inserts 6 may be of either a single-hole type, as shown in FIG. 13, or a double-hole type, as shown in FIG. 14. In this latter case, the two panels 3 may be connected through a single suitably holed L-shaped bracket, or through two separate L-shaped brackets of the type shown in FIG. 12.

Analogously to the implementation shown in FIGS. 10 and 11, also in the implementation shown in FIGS. 12 to 14, the melting of the primer washers 14 during re-entry of the satellite 1 into the Earth's atmosphere removes any connection between the two panels 3 and the bracket 20, allowing them to disengage from each other by sliding in the coupling direction.

The various embodiments and implementations of the present invention described above and shown in the attached drawings may be modified and varied without thereby departing from the protective scope of the present invention, as defined in the appended claims.

For example, the connecting members may be of a type different from those previously described and shown in the drawings. In particular, instead of being of the type based on a threaded engagement, which is formed by pairs of threadly engaged mating elements comprising a male threaded element (screw 13) and a female threaded element (threaded hole 6 in the insert 6), the connecting members may be of the type based on rivets or hinges.

On the basis of the aforesaid, the advantages of the present invention with respect to the state of the art solution are evident.

In particular, the present invention satisfies the requirements relating to the survival in orbit of the satellites and those relating to their demise during the re-entry into the atmosphere at the end of the mission by means of an extremely simple and economical solution that does not require the redesign of other parts of the satellites.

The invention claimed is:

1. A space system (1) comprising:
a structure (2) formed by structure components (3),
an on-board equipment (5) carried by the structure (2), and
a passive device designed to facilitate demise of the space system (1) during re-entry into the Earth's atmosphere;

wherein the passive device comprises connecting members (4) designed to stably connect the structure components (3) to each other;

wherein each connecting member (4) comprises a plurality of connecting components (6, 7, 13, 14) designed to mate with each other so as to create a stable connection between a corresponding pair of structure components (3) during launch and orbit operation of the space system (1);

wherein at least one connecting member (4) includes at least one primer component (14) that is made of a primer material which is different from that of the other connecting components (6, 7, 13) and that decays at re-entry altitudes greater than those at which the other connecting components (6, 7, 13) decay, thereby (i) loosening the stable connection created by the connecting member (4) during re-entry of the space system (1) into the Earth's atmosphere (ii) allowing the two structure components (3) to disconnect from each other, and (iii) triggering demise of the structure (2) of the space system (1).

2. The space system according to claim 1, wherein at least part of the components (6, 7, 13) in each connecting member (4) are coupled by means of a threaded engagement and the primer component is in the form of a washer (14).

3. The space system according to claim 1, wherein the connecting members (4) are designed to cause the corresponding pairs of structure components (3) to disengage from each other by sliding in a direction parallel to the axis of connection.

4. The space system according to claim 3, wherein each connecting member (4) comprises two inserts (6, 7), each of which is stably coupled to a respective structure component (3);

wherein a first insert (6) is provided with a threaded hole (8), and wherein the second insert (7) comprises a tubular member defining a through hole (9) which, when the two structure components (3) are connected, is coaxial to the threaded hole (8) in the first insert (6);

wherein the connecting member (4) further comprises a screw (13), which extends through the through hole (9) and engages the threaded hole (8); and a primer washer (14) formed in said primer material, inserted on the screw (13) and arranged between an head of the screw (13) and the through hole (9) in the second insert (7), and having an outer diameter greater than that of the through hole (9) so as to extend laterally and rest on the surface of the relative structure component (3), outside the through hole (9).

5. The space system according to claim 4, wherein the primer washer (14) is further integrally provided with a tubular appendix (14a), which is made of said primer material, extends through the through hole (9) and is sized so as to fill entirely the through hole (9).

6. The space system according to claim 3, wherein each connecting member (4) comprises two inserts (6), each of which is stably coupled to a corresponding structure component (3) and is provided with a threaded hole (8);

wherein the connecting member (4) further comprises an L-shaped bracket (20) with arms (20a) respectively bound to respective inserts (6) by means of screws (13) that engage respective holes in the arms (20a) via respective primer washers (14) formed of said primer material;

wherein the holes in the arms (20a) of the bracket (20) have a diameter greater than the ones of the heads of the screws (13), while the primer washers (14) have an outer diameter greater than the one of the holes in the arms (20a) of the bracket (20).

7. The space system according to claim 6, wherein the inserts (6) are of either a single-hole type or a double-hole type.

8. The space system according claim 1, wherein the connecting members (4) are designed to allow the respective pairs of structure components (3) to disengage from each other by sliding in a direction transverse to the connection direction.

9. The space system according to claim 8, wherein each connecting member (4) comprises two inserts (6, 7), each of which is stably coupled to a respective structure component (3) along an edge of the respective structure component (3);

wherein a first insert (6) is provided with a threaded hole (8), and the second insert (7) has a slot (12), which has an open side on the edge of the respective structure component (3) and is arranged, when the two structure components (3) are coupled, in a position facing the threaded hole (8) of the first insert (6);

wherein the connecting member (4) further comprises a screw (13) which extends through the slot (12) and engages the threaded hole (8); and a primer washer (14), which is made of said primer material, is inserted on the screw (13) and is arranged between a head of the screw (13) head and the slot (12) in the second insert (7);

whereby the decay of the primer material during re-entry of the space system (1) into the Earth's atmosphere results in the reduction of the connecting force exerted by the connecting member (4) between the two structure components (3), so as to allow the second insert (7) to slide with respect to the first insert (6) in a direction substantially orthogonal to the axis of the screw (13) until the screw (13) is caused to exit from the slot (12), with a consequent disengagement of the two structure components (3).

10. The space system according to claim 9, wherein each connecting member (4) further comprises a holed cupel (15) which is inserted on the screw (13) and has a raised peripheral edge defining a seat in which the primer washer (14) is partially housed so as to axially protrude from the peripheral edge of the holed cupel (15).

11. The space system according to claim 9, wherein the primer washer (14) is integrated in the second insert (7).

12. The space system according to claim 11, wherein the second insert (7) defines a cavity (9) delimited by a side wall (10) and by a bottom (11), which is in contact with the first insert (6) when the two structure components (3) are coupled, and in which the slot (12) is formed;

wherein the bottom (11) is provided, on its side arranged on the edge of the respective structure component (3), with an edge which folds towards the inside of the cavity (9) and defines, along with the bottom (11) and the side wall (10), a housing (17) in which the primer washer (14) is partially housed so as to axially protrude from the folded edge of the bottom (11); and wherein the second insert (7) further comprises a covering holed plate (18) to hold the primer washer (14) in the housing (17) when the screw (13) engages the threaded hole (8) of the first insert (7).

13. A method of use for a passive device having the features claimed in claim 1 in a space system (1) to facilitate demise of the space system (1) during re-entry into the Earth's atmosphere.

* * * * *